United States Patent

Sheckler

[15] 3,672,451
[45] June 27, 1972

[54] BEAN HARVESTER

[72] Inventor: Addison C. Sheckler, Bonta Bridge Road R.D. #1, Cato, N.Y. 13033

[22] Filed: May 22, 1970

[21] Appl. No.: 39,841

[52] U.S. Cl. ........................................... 171/58
[51] Int. Cl. ....................................... A01d 25/04
[58] Field of Search ........................... 171/50–58; 56/121.4, 121.41, 121.42, 121.44, 121.45, 121.46

[56] References Cited

UNITED STATES PATENTS

| 3,306,017 | 2/1967 | Wells | 56/121.45 |
| 3,257,787 | 6/1966 | Wells | 56/121.45 |
| 389,348 | 9/1888 | Whilden | 171/53 |

*Primary Examiner*—Antonio F. Guida
*Attorney*—F. P. Keiper

[57] ABSTRACT

Harvester for beans and the like having a mobile support for parallel rows of bean plants, a pair of convex laterally disposed disks rotatably mounted on the support having peripheral notches, and being spaced apart and spaced to correspond substantially to the spacing of adjacent plant rows, and having their axes tilted transversely and rearwardly and having their convex faces adjacent their peripheries adapted to ride on the ground inwardly and forwardly of the disk centers, means for rotating the disks so their adjacent peripheries move rearwardly at the approximate forward speed of the support, stripper means overlying the adjacent areas of each disk adapted to move the plants of two rows into a common windrow between the disks, stripper plates disposed over the concave sides of each of the disks in an area opposite to the stripper bar areas, and a floating spring counterbalance support connected to the mobile support employing parallelogram linkages.

3 Claims, 6 Drawing Figures

INVENTOR.
ADDISON C. SHECKLER.

BY
ATTORNEY

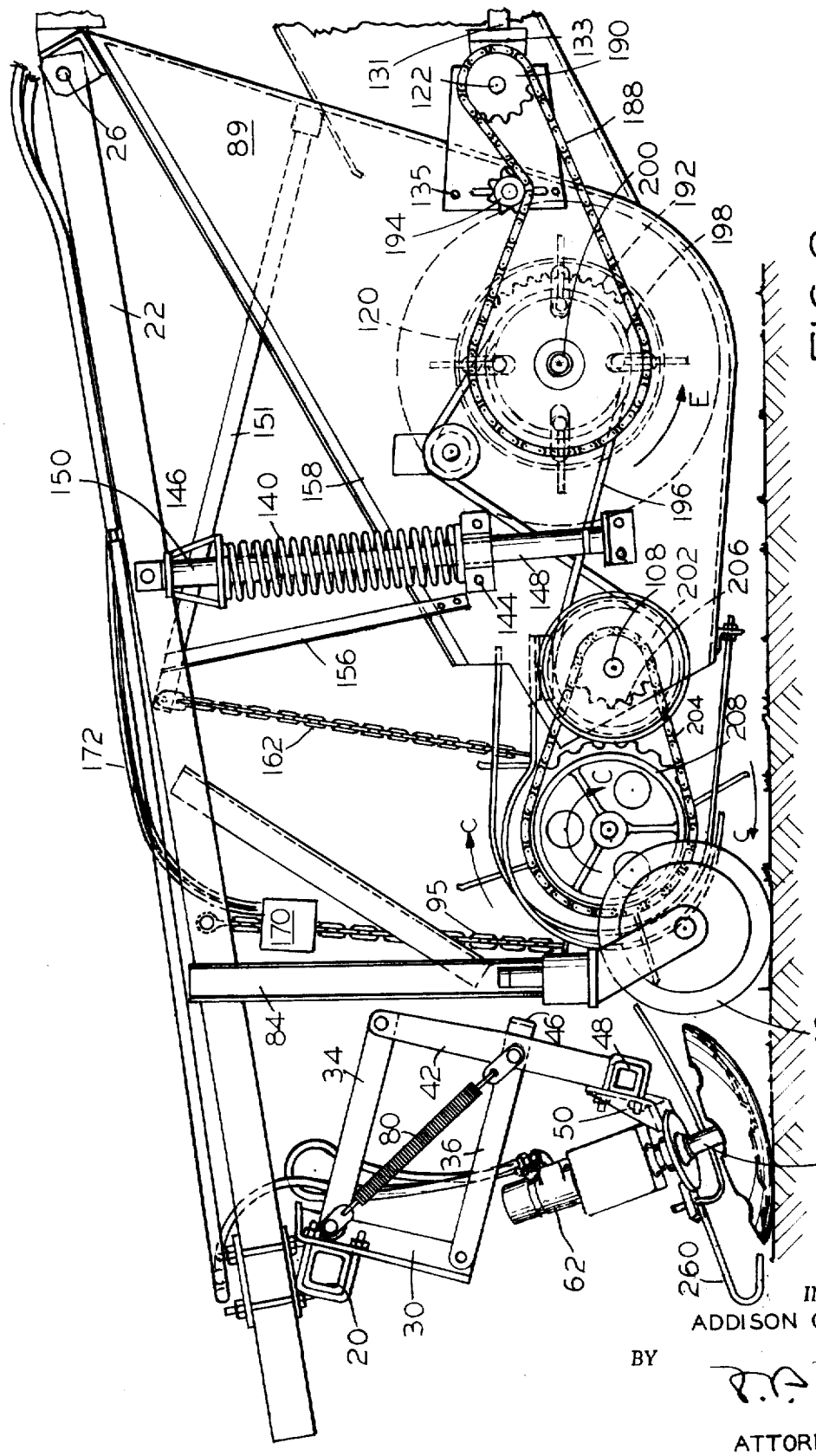

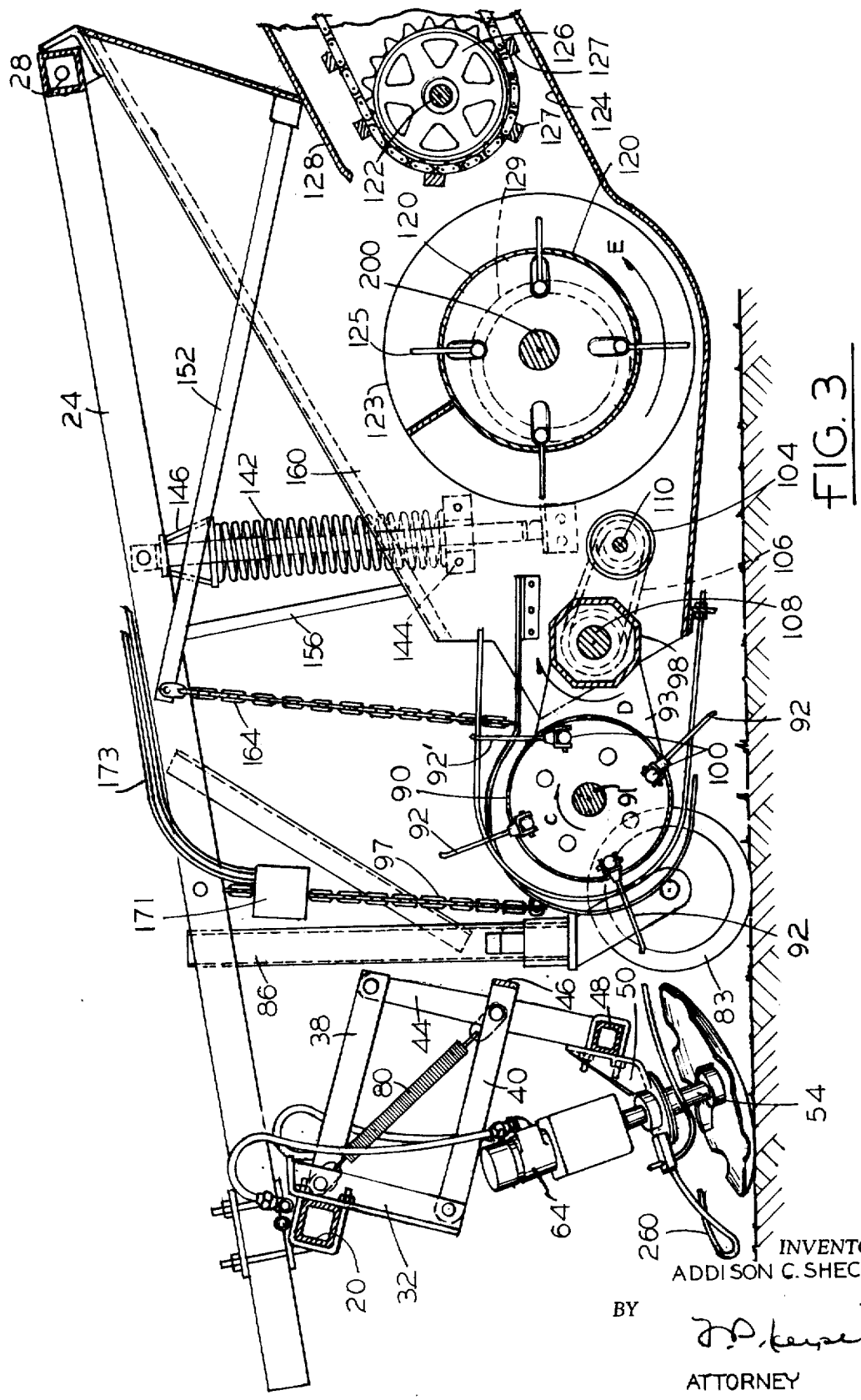

INVENTOR.
ADDISON C. SHECKLER
BY
ATTORNEY

BEAN HARVESTER

This invention relates to harvesters for beans, soy beans, black turtle soup beans and the like.

More particularly the invention contemplates the use of a mobile harvester having rotary peripherally notched dished disks, working in pairs and set at suitable opposed angles for pulling laterally at ground level two rows of bean plants and disposing the loose plants in a single windrow. A plurality of pairs may be provided, suitably spaced transversely so as to cooperate the plurality of pairs of rows of bean plants uniformly and correspondingly spaced along the length of the harvest area. The invention is further directed toward providing a relatively floating action to maintain the harvest disks with a peripheral area thereof substantially tangential with the ground, and drive means for the disks adapted to establish peripheral velocities commensurate with the rate of movement of the apparatus in harvesting. The apparatus is simple and effective.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIG. 2 is a side view of the apparatus;

FIG. 3 is a longitudinal section through the apparatus taken substantially on the line 3—3 of FIG. 1;

Figure 1:
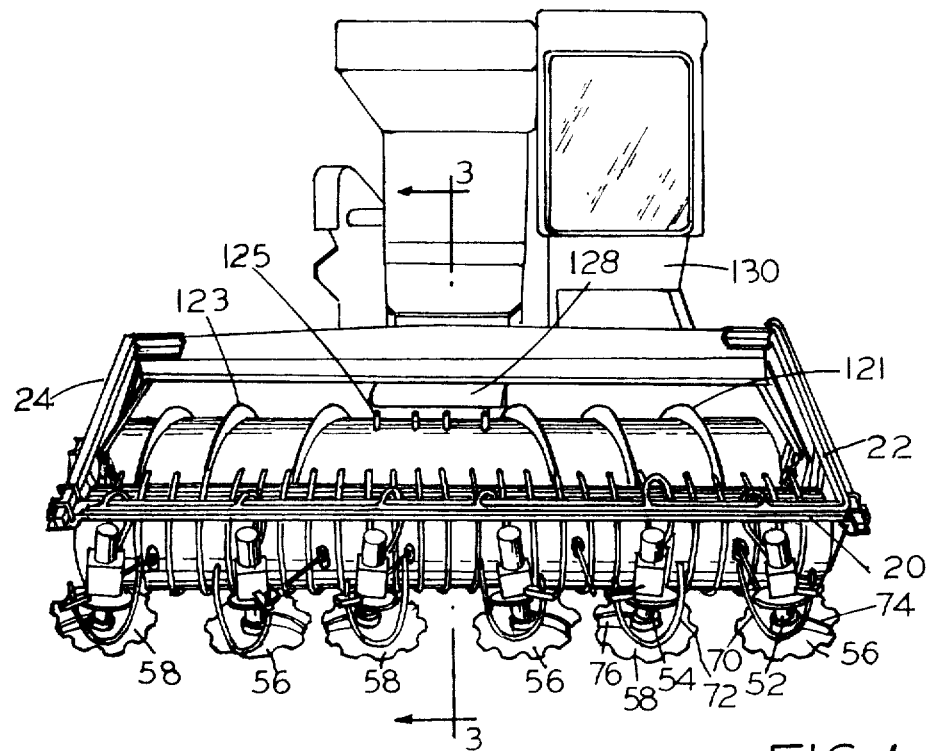
FIG. 1 is a perspective front view of the apparatus.
Figure 6:
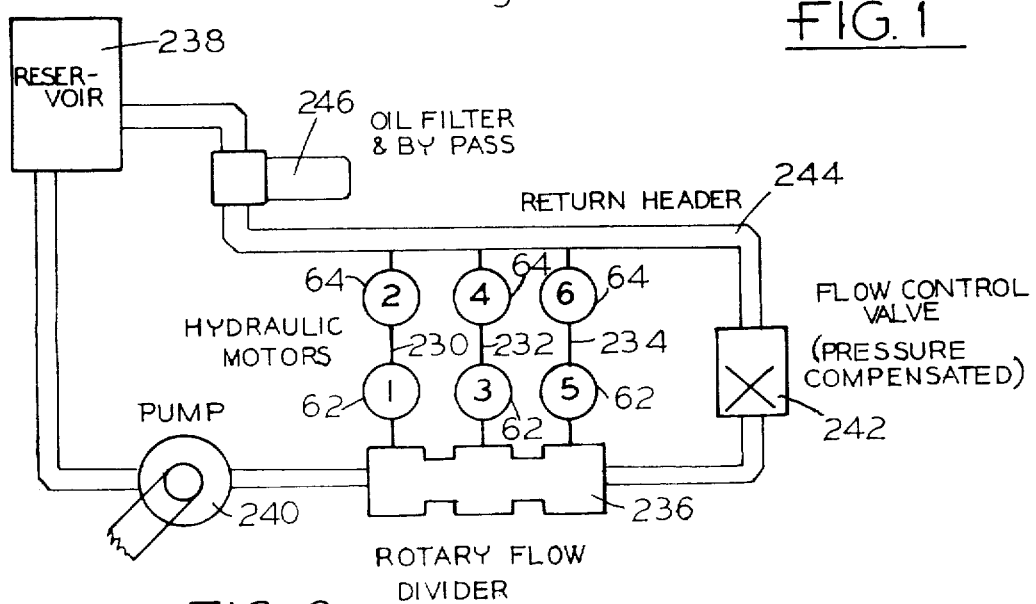
FIG. 6 is a schematic diagram of the hydraulic circuit

Referring to the drawings, there is shown in FIG. 1, apparatus for pulling bean plants, such as navy beans and the like arranged in rows, the apparatus being adapted to pull six uniformly spaced rows and gather the six rows in three windrows of pulled bean plants. As can be seen in FIGS. 1–4, there is provided a heavy tubular transverse bar 20 affixed to side arms 22 and 24, which extend rearwardly to pivotal mountings 26 and 28 of the tractor propelled gathering apparatus disposed to the rear of the bar 20. Rigidly affixed to the bar 20 and depending therefrom are rigid angle sectioned members 30 and 32, arranged in pairs and from which extend rearwardly parallelogram linkages 33 and 35, each including links 34 and 36, and 38 and 40, that are pivotally attached to floating arms 42 and 44.

The links 36 and 40 may be in the form of a "U" member having a connecting portion 46.

The lower ends of each pair of arms 42 and 44 are rigidly connected by a tubular transverse bar 48 having a forward extending bearing bracket 50, in which is journalled a shaft such as 52 or 54, each having a segmental spherical gathering disk such as 56 or 58. Supported above each of the bearing brackets is a coupling housing 60 having hydraulic motors 62 and 64 mounted thereon for driving the shafts 52 and 54.

Figure 4:
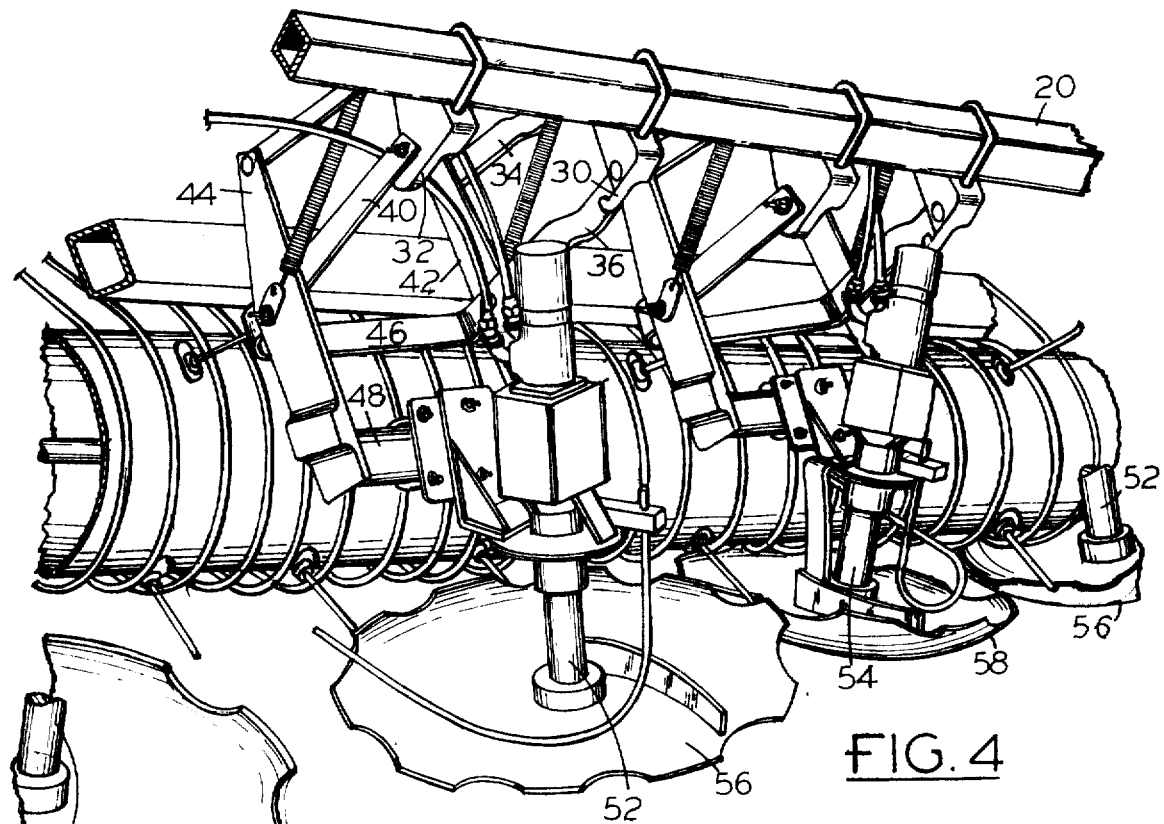
FIG. 4 is a perspective view of one end of the front of the apparatus.
Figure 5:
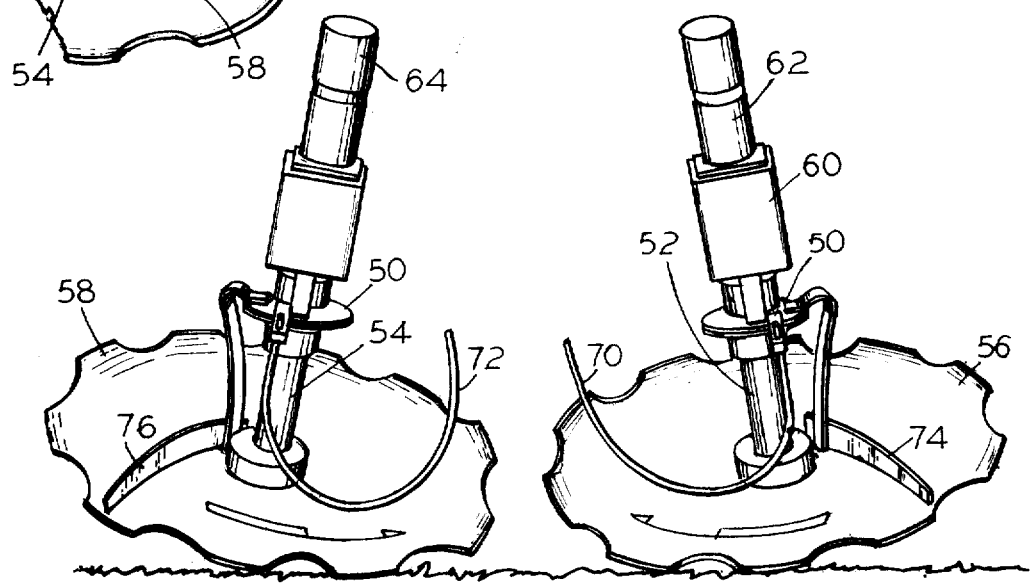
FIG. 5 is a front elevational view of a pair of gathering disks.

As can be seen in FIGS. 1 and 4, the disks 56 and 58 are disposed in pairs, each pair of disks being shown in front elevation in FIG. 5, and side elevation in FIGS. 2 and 3. The bearing brackets 50 are set at angles such that shaft 52 inclines downwardly to the right about 10° from the vertical while shaft 54 inclines downwardly to the left about 10°. Each of the bearing brackets are also set so the shafts 52 and 54 project downwardly and rearwardly about 20 degrees from the vertical.

Each of the dished disks 56 and 58 are preferably identical, and in practice are circular spherical segments, the peripheral diameter of which may be about 22 inches with a dish depth of about 2½ to 3½ inches. The peripheral edge of each of the disks is provided with a plurality of arcuate deep notches 66.

The lateral and rearward inclination of the axes of the disks is such as to render a portion of each disk close to the peripheral edge thereof, tangential to the ground level. Each of the disks of each of the three pairs rotate oppositely in the direction of the arrows A and B, and ground friction about 3 inches, to the right of the center of disk 58, and about 3 inches to the left of center of disk 56 (see FIG. 5), tends to rotate the disks, which are additionally powered by the hydraulic motors 62 and 64, which drive the disks through speed reducing gearing, such that the adjacent peripheral edges of a pair of disks, as seen in FIG. 5, move rearwardly at about the speed of forward motion of the apparatus or combine.

Supported from the bearing bracket 50 for each of the disks are right and left stripper bars 70 and 72 in the form of stiff rods, which overlie their respective disks 56 and 58 of each pair, the bars extending forwardly, and thence spirally outward over their respective disks, to move the plants, pulled by the pair of disks, into a common single windrow disposed along a line intermediate of each pair of cooperating disks. Also supported from the bearing brackets 50 are stripper plates 74 and 76 which overlie their respective disks 56 and 58 on the opposite side from said bars 70 and 72. The lower edges of the plates 74 and 76 closely conform to the curvature of the concave sides of their respective disks and are curved to cam the rocks and debris from the disks. The plates are of a suitable height to clear the disks of any dirt, stones or rocks continuously, causing the same to be discharged from the disks laterally of the location of the pair of plant rows being approached for pulling.

The weight of each of the disks and its driving motor is counter-balanced by diagonal springs 80 extending across the parallelogram linkages as shown, and such springs are effective to substantially counterbalance the weight,without providing any lifting force sufficient to allow the disks to rise from the ground. The level at which the forward ends of the arms 22 and 24 are maintained is determined by a pair of broad tread ground engaging caster wheels 82 and 83 mounted on the lower end of struts 84 and 86, suitably spaced so as to avoid contact with rows of plants to one side of the apparatus yet to be harvested.

While the beam 20 with its floating mounts for the cooperating pairs of disks 56 and 58 may be mounted upon a tractor or other suitable apparatus, to provide apparatus to pull an adjacent pair of rows of bean plants in pairs and dispose the same in a single windrow, it is also desirable to apply the gathering or pulling apparatus forward of a combine adopted to gather and separate the beans, and of a width capable of covering as many as six rows of bean plants in each pass over the field, such apparatus comprising three pairs of puller disks, each pair of which acts to establish a windrow of pulled plants.

As shown in the drawings, the combine is provided with a pickup apparatus 89 having a forward multiple tine sweeper drum 90 driven in the direction of arrow C and having a plurality of sweeping tines 92 which project radially from drum and between relatively closely spaced arcuate stiff guide rods 94, which are rearwardly supported from a transverse member 96 disposed beneath and behind the sweeper. The guide rods 94 extend up and around the drum 90 and extend rearwardly to a point overlying a polygonally sectioned drum 98 disposed behind the drum 90, and rotating in the direction of arrow D. The tines 92 are mounted on transverse rocker bars 100, which maintain the tines radial during the sweeping portion of the operation. The rocker bars 100 are cam actuated so as to cause the tines to maintain a vertical position as is indicated at 92' as they recede downwardly behind the drum 90, so as to clear the drum 98, after which the bars 100 are cammed to restore the tines to a radial position for sweeping action. The camming apparatus thus employed is well understood in the art.

The shaft 91 of the sweeper drum 90 is journalled at its ends in side plates such as 93 which extend forwardly from their pivotal mounting on shaft 108 of the roll 98. The height of the drum 90 above the ground is controlled by side chains 95 and 97 extending upwardly to the arms 22 and 24.

Behind the polygonal roll 98 is a cylindrical roll 104 rotating clockwise as seen in FIG. 3, and driven from a belt drive 106 having pulleys located on the far side of the apparatus on the ends of the shafts 108 and 110 on which the rolls 98 and 104 are mounted.

The drum 90, rolls 98 and 104 are suitably spaced to permit stones and foreign matter to drop from the plants or vines travelling rearwardly thereabove to the tined and helically bladed gathering drum 120. The drum 120 rotates counterclockwise, as is indicated by arrow E to move the harvest laterally to the center and onto the upwardly inclined chute 124, over which is located a conveyor elevator apparatus 126 with flight bars 127.

The drum has oppositely pitched spiral blades 121 and 123 at its opposite ends to move the harvest to the center area, and sweeping tines 125, to deliver the harvest to the elevator 126. The tines 125 may recede to assist stripping through eccentric cam means schematically indicated at 129. The conveyor 126 is disposed in a housing having a cover 128, and delivers the vines and beans to separating apparatus in the power tractor 130. The bars 22 and 24 are pivoted on the pickup apparatus 28 which apparatus is pivoted on tractor 130 on axis to the rear of 26 and 28. The tractor is provided with a pair of hydraulicly actuated forwardly extending push bars such as 131, which project into sockets such as 133 affixed to the opposite sides of the pick up apparatus as at 135. By hydraulicly thrusting the bars 131 forward, the entire forward end of the pickup apparatus may be pivotally raised sufficiently to clear ground obstacles for transport.

Each of the side arms 22 and 24 is in part resiliently supported intermediate of their length by coil springs 140 and 142, the lower end of which bear against perches such as 144, and the upper ends of which bear against seats 146 pivotally secured to the respective arms 22 and 24. Concentrically disposed within the spring is an upwardly extending push rod 148, the upper end of which rides telescopically in a tubular socket 150. When the pickup apparatus 89 is lifted from the ground for transport, the upper end of the push rod 148 is moved upward within the socket 150 to engage the upper end of the socket, and thereafter, further lifting of the apparatus 89 lifts the arms 22 and 24, to lift the caster wheels 82 and 83 and the forward gathering disks from the ground.

On opposite sides of the gathering apparatus 89 are bars 151 and 152 having struts 154 and 156 secured to the side panels 158 and 160 of the gathering apparatus. From the forward ends of the bars are support chains 162 and 164 which extend to the side plates such as 93 on either side which pivotally support the sweeper drum forwardly of, and upon the shaft 108 of the octagonal drum. Either of the chains 95 and 97 have interposed along their length a tension sensing apparatus, 170 or 171 from which indications are transmitted by communication cables 172 or 173 to the cab of the tractor.

The drive for the drums may be from the powered driven shaft 122 of the conveyor 126 through a chain 188 and sprockets 190 and 192, with idler 194, and a crossed belt drive 196 from a pulley 198 on the shaft 200 of drum 120 to a pulley 202 on the shaft 108. The sweeper drum 90 is driven from the shaft 108 by a sprocket chain and sprockets, 204, 206 and 208.

The two motors of each pair of gathering disks may be hydraulicly connected in series, and the three pairs of motors 230, 232 and 234 connected in parallel through a flow divider and to a source of controllable high pressure oil, such having a reservoir 238 and pump 240. By a pressure compensated bypass and flow control valve 242, the oil may be allowed to bypass the motors to any degree to vary the speed. The oil returns to the tank through the return header 244 and oil filter and bypass 246.

The apparatus harvests directly requiring no preparatory work, and also no risk due to leaving beans in a windrow through possible adverse weather. It is possible to harvest beans while part of the leaves are still on the plant since the bean pod will dry and even though the plant contains moisture this does not bother the harvesting. It is possible to move any place in the field if such conditions as mud limit the work, this is not possible where operations are done in a sequential manner. It is possible to harvest beans in heavy mud or grass infestations. This is true because of the nature of the bean plant and the nature of the harvester. The bean plant at maturity has only a tap root about 3–4 inches long consequently, the harvester pulls the plant and due to the tilt of the discs, lifts it clear of the dirt. On the other hand weeds and grass are well anchored in the ground and the disc cuts them off and again no dirt comes into the machine. Previous methods pulled weeds, roots and all and with large amounts of dirt. Also in bad weed infestations, the beans frequently were buried and lost due to the large amounts of dirt handled.

The action of the harvester follows. The disc is held tilted in the direction of travel and towards the row so that the disc is approximately tangent to the ground and the forward motion of the machine helps rotate the disc. The assembly floats on the ground. The disc is rotated by a hydraulic motor and this adds whatever energy is necessary above that imparted by the forward motion. The bean plant is gripped by the notches on the disc and is carried sideward and lifted upward out of the dirt. The velocity of the disc is such that the velocity at the edge tangent to the direction of motion of the machine is the same as the velocity of the machine and the velocity of the bean plant is zero. The plant is removed from the disc edge by the stripper bars 70 and 72 and then is left in a windrow or proceeds into the harvester depending on the machine configuration. Some dirt is lifted by the disk about 270° and then meets stripper plates 74 and 76 which causes the dirt to be discarded. Where adjacent rows overlap, lifters 260 extending forward of the disks may be provided to pull the adjacent rows apart immediately before gathering.

While a single form of the invention with a modification has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A harvester for beans and the like comprising a mobile support adapted to move along at least two parallel rows of bean plants, a pair of convex laterally disposed spherical segmental puller disks rotatably mounted on said support through floating parallelogram linkage means, one for each disk, said disks each having peripheral notches, and being spaced apart and spaced to correspond substantially to the spacing of a pair of plant rows, said disks having drive shafts journalled in bearing brackets with their axes tilted transversely and oppositely in the order of 10° and rearwardly in the order of 20°, each linkage means having means to substantially counter balance the puller disks, the disks having their convex faces adjacent their peripheries adapted to ride on the ground inwardly and forwardly of the disk centers, separate power means including speed reducing gearing for rotating each of the disks mounted on each of said bearings to drive adjacent peripheries of said disks to move rearwardly at the approximate forward speed of the support, stripper bars overlying the adjacent areas of each disk adapted to move the plants of two rows into a common windrow between the disks, and fixed stripper plates disposed over the concave sides of each of said disks in an area opposite to the stripper bar areas to clear debris from the disks.

2. A harvester in accordance with claim 1 wherein the disks of a pair are oppositely driven by hydraulic motors connected in series.

3. A harvester in accordance with claim 1 wherein the mobile support is provided with a plurality of pairs of disks laterally disposed and wherein there is provided gathering apparatus behind the disks to lift the windrows from the ground for delivery to mobile bean separating apparatus.

* * * * *